United States Patent
Chenevier et al.

(10) Patent No.: US 11,020,728 B2
(45) Date of Patent: Jun. 1, 2021

(54) CATALYST COMPRISING A BORON-DOPED ACTIVE PHASE

(71) Applicant: IFP Energies Nouvelles, Rueil-Malmaison (FR)

(72) Inventors: Romain Chenevier, Peaugres (FR); Dominique Decottignies, Saint-Genis-Laval (FR); Vincent Lecocq, Orlienas (FR); Marie Velly, Maclas (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 30 days.

(21) Appl. No.: 15/565,913

(22) PCT Filed: Feb. 22, 2016

(86) PCT No.: PCT/EP2016/053631
§ 371 (c)(1),
(2) Date: Oct. 12, 2017

(87) PCT Pub. No.: WO2016/165859
PCT Pub. Date: Oct. 20, 2016

(65) Prior Publication Data
US 2018/0104672 A1    Apr. 19, 2018

(30) Foreign Application Priority Data

Apr. 16, 2015  (FR) .................................. 1553399

(51) Int. Cl.
| | | |
|---|---|---|
| *B01J 23/75* | (2006.01) | |
| *C10G 2/00* | (2006.01) | |
| *B01J 21/12* | (2006.01) | |
| *B01J 37/02* | (2006.01) | |
| *B01J 23/00* | (2006.01) | |
| *B01J 35/00* | (2006.01) | |
| *B01J 37/08* | (2006.01) | |
| *B01J 37/14* | (2006.01) | |
| *B01J 35/10* | (2006.01) | |
| *B01J 21/02* | (2006.01) | |
| *B01J 21/00* | (2006.01) | |
| *B01J 23/46* | (2006.01) | |
| *B01J 23/745* | (2006.01) | |
| *B01J 23/755* | (2006.01) | |

(52) U.S. Cl.
CPC ............. *B01J 23/75* (2013.01); *B01J 21/005* (2013.01); *B01J 21/02* (2013.01); *B01J 21/12* (2013.01); *B01J 23/005* (2013.01); *B01J 35/0006* (2013.01); *B01J 35/1014* (2013.01); *B01J 35/1019* (2013.01); *B01J 35/1038* (2013.01); *B01J 35/1042* (2013.01); *B01J 37/0201* (2013.01); *B01J 37/024* (2013.01); *B01J 37/0207* (2013.01); *B01J 37/0236* (2013.01); *B01J 37/08* (2013.01); *B01J 37/14* (2013.01); *C10G 2/332* (2013.01); *B01J 23/462* (2013.01); *B01J 23/745* (2013.01); *B01J 23/755* (2013.01)

(58) Field of Classification Search
CPC ........................................................ B01J 23/75
USPC ........................................................ 502/300
See application file for complete search history.

(56) References Cited

U.S. PATENT DOCUMENTS

| | | | |
|---|---|---|---|
| 8,071,655 B2 | 12/2011 | Diehl | |
| 9,486,789 B2 | 11/2016 | Decottignies | |
| 2002/0037937 A1* | 3/2002 | Raje | ......................... B01J 21/02 518/715 |
| 2004/0054016 A1 | 3/2004 | Lu | |
| 2015/0266006 A1* | 9/2015 | Decottignies | ........ B01J 27/1853 518/715 |

FOREIGN PATENT DOCUMENTS

| | | |
|---|---|---|
| EP | 2921227 A1 | 9/2015 |
| FR | 2879478 A1 | 6/2006 |

OTHER PUBLICATIONS

International Search Report PCT/EP2016/053631 dated Jun. 1, 2016.

* cited by examiner

*Primary Examiner* — Douglas B Call
(74) *Attorney, Agent, or Firm* — Millen, White, Zelano and Branigan, P.C.

(57) ABSTRACT

A catalyst containing an active phase comprising at least one metal of group VIIIB selected from cobalt, nickel, ruthenium and iron deposited on a support containing silica, alumina and at least one simple spinel MAl2O4 or mixed spinel MxM'(1-x)Al2O4) which is or is not partial, wherein M and M' are separate metals selected from the group formed by magnesium, copper, cobalt, nickel, tin, zinc, lithium, calcium, caesium, sodium, potassium, iron and manganese, and wherein x is between 0 and 1, the values 0 and 1 being themselves excluded, characterised in that said active phase further comprises boron, the boron content being between 0.001% and 0.5% by weight with respect to the total weight of the catalyst, the value 0.5 being itself excluded.

14 Claims, No Drawings

CATALYST COMPRISING A BORON-DOPED ACTIVE PHASE

TECHNICAL FIELD

The present invention concerns the field of catalysts used for reactions for the synthesis of hydrocarbons from a mixture of gases comprising carbon monoxide and hydrogen, generally referred to as Fischer-Tropsch synthesis.

STATE OF THE ART

The Fischer-Tropsch synthesis processes make it possible to obtain a wide range of hydrocarbon cuts from the mixture of CO+H2, commonly referred to as synthesis gas. The overall equation of Fischer-Tropsch synthesis can be written in the following fashion:

$$nCO + (2n+1)H_2 \rightarrow C_nH_{2n+2} nH_2O$$

Fischer-Tropsch synthesis is at the very heart of the processes for the conversion of natural gas, coal or biomass into fuels or intermediates for the chemical industry. Those processes are referred to as GTL ("Gas to Liquids" using the English terminology) in the case of using natural gas as the initial feedstock, CTL ("Coal to Liquids" using the English terminology) for coal and BTL ("Biomass to Liquids" using the English terminology) for the biomass.

In each of these cases the initial feedstock is firstly gasified into a synthesis gas comprising a mixture or carbon monoxide and dihydrogen. The synthesis gas is then transformed in respect of the majority part thereof into paraffins by virtue of Fischer-Tropsch synthesis and those paraffins can then be transformed into fuels by a hydroisomerisation-hydrocracking process. For example transformation processes such as hydrocracking, deparaffining and hydroisomerisation of heavy cuts (C16+) make it possible to produce different types of fuels in the range of medium distillates: gasoil (cut 180-370° C.) and kerosene (cut 140-300° C.). The lighter C5-C15 cuts can be distilled and used as solvents.

The Fischer-Tropsch synthesis reaction can be carried out in different types of reactors (fixed bed, mobile bed or three-phase bed (gas, liquid, solid) for example of the perfectly agitated autoclave type, or slurry bubble column) and the products of the reaction have in particular the characteristic of being free from sulphur, nitrogen or aromatic type compounds.

In an implementation in a reactor of bubble column type (or "slurry bubble column" using the English terminology, or again "slurry" in a simplified expression), which uses a divided catalyst in the state of very fine powder, typically of the order of some tenths of a micrometer, that powder forming a suspension with the reaction medium.

The Fischer-Tropsch reaction takes place in conventional fashion at between 1 and 4 MPa (between 10 and 40 bars), at temperatures which are conventionally between 200° C. and 350° C. The reaction is overall exothermic, which means that particular attention has to be paid to use of the catalyst.

The catalysts used for Fischer-Tropsch synthesis are essentially catalysts based on cobalt or iron, even if other metals can be used. Nonetheless cobalt and iron offer a good compromise in terms of performance levels/price in relation to other metals.

The conventional methods for the preparation of supported metallic catalysts used for Fischer-Tropsch synthesis involve depositing a metallic salt or a metal-ligand coordination complex on the support, and then carrying out one or more thermal treatments performed in air, followed by a reducing treatment effected ex-situ or in-situ.

In order to improve the catalytic properties of the supported metallic catalysts used for Fischer-Tropsch synthesis doping elements can be added either in the active phase of the catalysts or directly in the support. The doping element makes it possible in general to improve the reducibility of the metal of group VIIIB and therefore its activity or its selectivity, or again to slow down deactivation thereof. Boron is included in the category of doping elements for the active phase of the catalysts.

U.S. Pat. No. 6,593,378 describes a process for Fischer-Tropsch synthesis using a catalyst comprising cobalt as the active phase and a support prepared from an alumina support and aluminium borate. This document demonstrates that the presence of aluminium borate in the support makes it possible to improve the activity of the catalyst.

The article which appeared in Journal of Catalysis, 2011, 280, 50-59 by Sayes et al describes a catalyst comprising an active phase comprising 20% by weight of cobalt and between 0.5% and 2.0% by weight of boron with respect to the total weight of the catalyst, and an alumina support (γ-Al2O3). The boron is supplied on its own in the last step for preparation of the catalyst. However the addition of between 0.5% and 2% by weight of boron has a limited effect on the reducibility of the cobalt and on the levels of performance of the catalyst. On the other hand it makes it possible to significantly improve the stability of the catalyst, limiting the formation of carbon-bearing deposit on the catalyst.

WO 02/068564 describes a catalyst comprising an active phase comprising 20% by weight of cobalt and 0.5% by weight of boron with respect to the total weight of the catalyst, and an alumina support. The process for the preparation of that catalyst comprises a step in which the cobalt precursor and the boron precursor are added simultaneously (co-impregnation). However the addition of boron at such a quantitative level to the catalyst does not make it possible to significantly improve its activity.

The applicant surprisingly discovered that a catalyst containing an active phase comprising at least one metal of group VIIIB and boron, in which the boron content is strictly lower than 0.5% by weight with respect to the total weight of the catalyst, deposited on a support containing silica, alumina and a spinel, makes it possible to improve their catalytic performances in a process of Fischer-Tropsch type, and more particularly makes it possible to significantly enhance the activity of the catalyst. Such a catalyst is obtained by a preparation process comprising at least one step in which the precursor of at least one metal of group VIIIB and a boron precursor are added simultaneously in solution. The Fischer-Tropsch process is then carried out in the presence of a catalyst having improved activity, without in that respect reducing its stability and its selectivity rate.

OBJECTS OF THE INVENTION

A first object of the invention concerns a catalyst containing an active phase comprising at least one metal of group VIIIB selected from cobalt, nickel, ruthenium and iron deposited on a support containing silica, alumina and at least one simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), and wherein x is between 0 and 1, the values 0 and 1 being themselves excluded, characterised in that said active phase further comprises boron, the boron content being between 0.001% and 0.5% by weight with respect to the total weight of the catalyst, the value 0.5 being itself excluded.

Advantageously said support is a silica-alumina in which the spinel is included. Preferably the spinel content is between 3 and 50% by weight with respect to the weight of the support.

Preferably the metal M or M' content is between 1 and 20% by weight with respect to the weight of the support.

Advantageously M is cobalt in the case of a simple spinel and M is cobalt and M' is magnesium or zinc in the case of a mixed spinel.

Preferably the content of metal of group VIIIB of the active phase is between 0.01 and 60% by weight with respect to the weight of the catalyst.

Another object concerns a process for the preparation of a catalyst according to the invention, which process comprises at least one step in which said support containing silica, alumina and spinel is impregnated with an aqueous or organic solution comprising at least one metal salt of group VIIIB selected from cobalt, nickel, ruthenium and iron, and at least one boron precursor.

Advantageously the process according to the invention comprises the following steps:

a support containing silica and alumina is provided;

said support is impregnated with an aqueous or organic solution comprising at least one salt of metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), it is then dried and calcined at a temperature between 700 and 1200° C. so as to obtain a simple spinel $MAl_2O_4$ or mixed spinel $M_xM'_{(1-x)}Al_2O_4$ which is or is not partial, wherein M and M' are separate metals and x is between 0 and 1, the values 0 and 1 being themselves excluded;

said support containing silica, alumina and spinel is impregnated a first time with an aqueous or organic solution comprising at least one salt of metal of group VIIIB selected from cobalt, nickel, ruthenium and iron;

said support containing silica, alumina and spinel is impregnated a second time with an aqueous or organic solution comprising at least one salt of metal of group VIIIB selected from cobalt, nickel, ruthenium and iron;

in which process said aqueous or organic solution impregnated in step c) and/or d) further comprises the boron precursor.

Preferably the boron precursor is introduced solely in the aqueous or organic solution supplied in step d).

Advantageously the content of the metal or metals of group VIIIB supplied in step c) is between 0.005 and 30% by weight with respect to the weight of the catalyst.

Advantageously the content of the metal or metals of group VIIIB supplied in step d) is between 0.005 and 30% by weight with respect to the total weight of the catalyst.

Preferably the boron precursor is boric acid.

Advantageously the catalyst obtained in step d) is dried at a temperature of between 30 minutes and 3 hours and then said dried catalyst is calcined in an oxidising atmosphere at a temperature of between 320° C. and 460° C.

Preferably the dried and calcined catalyst is reduced at a temperature of between 200° C. and 500° C.

Another object concerns a Fischer-Tropsch process for the synthesis of hydrocarbons in which the catalyst according to the invention or prepared by the process according to the invention is brought into contact with a feedstock comprising synthesis gas under a total pressure of between 0.1 and 15 MPa at a temperature of between 150 and 350° C. and at an hourly space velocity of between 100 and 20000 volumes of synthesis gas per volume of catalyst and per hour with a $H_2/CO$ molar ratio of the synthesis gas of between 0.5 and 4

DETAILED DESCRIPTION OF THE INVENTION

In the following description the groups of chemical elements are set forth in accordance with the CAS classification (CRS Handbook of Chemistry and Physics, published by CRC Press, editor in chief D. R. Lide, 81st edition, 2000-2001). For example the group VIIIB according to the CAS classification corresponds to the metals of columns 8, 9 and 10 using the new IUPAC classification.

The textural and structural properties of the support and the catalyst described hereinafter are determined by characterisation methods known to the man skilled in the art. The total pore volume and the pore distribution are determined in the present invention by mercury porosimetry (cf Rouquerol F.; Rouquerol J.; Singh K. "Adsorption by Powders & Porous Solids: Principle, methodology and applications", Academic Press, 1999). More particularly the total pore volume is measured by mercury porosimetry in accordance with the standard ASTM D4284-92 with a wetting angle of 140°, for example by means of an Autopore III™ apparatus from Micromeritics™. The specific surface area is determined in the present invention by the B.E.T. method, being the method described in the same reference work as mercury porosimetry and more particularly in accordance with the standard ASTM D3663-03.

Catalyst

The invention concerns a catalyst containing an active phase comprising at least one metal of group VIIIB deposited on a support containing silica, alumina and at least one simple spinel MAl2O4 or mixed spinel MxM'(1-x)Al2O4) which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), and wherein x is between 0 and 1, the values 0 and 1 being themselves excluded, the active phase of the catalyst further comprising boron, the boron content being between 0.001% and 0.5% by weight with respect to the total weight of the catalyst, the value 0.5 being itself excluded.

The content of metal of group VIIIB in the active phase selected from cobalt, nickel, ruthenium and iron is between 0.01 and 60% by weight with respect to the weight of the catalyst.

In the case where the active phase comprises at least one metal selected from cobalt, nickel and iron, the content of said metal represents from 1 to 60% by weight, preferably from 5 to 30% by weight and very preferably from 10 to 30% by weight with respect to the weight of the catalyst.

In the case where the active phase comprise ruthenium the ruthenium content is between 0.01 and 10% by weight and preferably between 0.5 and 5% by weight with respect to the weight of the catalyst.

The boron content is between 0.001% and 0.5% by weight, the value 0.5 being itself excluded, and preferably between 0.01 and 0.4% by weight with respect to the weight of the catalyst, more preferably between 0.02 and 0.35% and still more preferably between 0.02 and 0.2% by weight with respect to the total weight of the catalyst.

The active phase of the catalyst may advantageously further comprise at least one supplementary doping element selected from a noble metal of groups VIIB or VIIIB. The supplementary doping element makes it possible to enhance the reducibility of the metal of group VIIIB and therefore its activity or its selectivity, or again to slow down deactivation thereof. When at least one supplementary doping element is present the content of supplementary doping element or elements is generally between 20 ppm and 1% by weight and preferably between 0.01 and 0.5% by weight with respect to the weight of the catalyst. In the case where the doping element is selected from a noble metal of groups VIIB or VIIIB it is preferably selected from platinum (Pt), palladium (Pd), rhodium (Rh) or rhenium (Re). Preferably the doping element is platinum (Pt).

The active phase therefore comprises boron and at least one metal of group VIIIB selected from cobalt, nickel, ruthenium and iron and optionally a supplementary doping element. Preferably the active phase comprises cobalt, boron and platinum. Preferably the active phase is formed by cobalt and boron. Still more preferably the active phase is formed by cobalt, boron and platinum.

The support of the catalyst used for carrying out the hydrocarbons synthesis process according to the invention is an oxides support containing alumina, silica and at least one spinel as described hereinbefore.

The alumina present in the oxides support is generally of a crystallographic structure of delta ($\delta$), gamma ($\gamma$), theta ($\theta$) or alpha ($\alpha$) alumina type, alone or as a mixture.

The support containing alumina, silica and at least one spinel as described hereinbefore can be prepared from an alumina irrespective of its specific surface area and the nature of its pore distribution. The specific surface area of the alumina from which the support is prepared is generally between 50 m2/g and 500 m2/g, preferably between 100 m2/g and 300 m2/g, more preferably between 150 m2/g and 250 m2/g. The total pore volume of the alumina from which the support is prepared is generally between 0.4 ml/g and 1.2 ml/g and preferably between 0.45 ml/g and 1 ml/g.

The pore distribution in the alumina from which the support is prepared can be of monomodal, bimodal or plurimodal type. Preferably it is of monomodal type. The pore size is of the order of 2 to 50 nm, with a mean pore size of between 5 and 25 nm, preferably between 8 and 20 nm.

The characteristics of the alumina that are set forth hereinbefore correspond to the characteristics of the alumina from which the support is prepared, that is to say prior to introduction of the silica, the metals M and possibly M' for formation of the spinel phase, of the active phase.

The silica content in the support varies from 0.5% by weight to 30% by weight, preferably from 1% by weight to 25% by weight and still more preferably from 1.5 to 20% by weight with respect to the weight of the support.

The expression a support containing alumina and silica is used to denote a support in which the silicon and aluminium are in the form of agglomerates of silica or alumina respectively, amorphous aluminosilicate or any other mixed phase containing silicon and aluminium. Preferably the alumina and the silica are present in the form of an oxides mixture $SiO_2$-$Al_2O_3$, referred to as silica-alumina. The term silica-alumina is used to denote an alumina containing a percentage of silica strictly greater than 10% by weight going up to 30% by weight with respect to the weight of the support. That silica-alumina is homogeneous on the micrometre scale and still more preferably homogeneous on the nanometre scale.

The spinel present in the oxides support is a simple spinel $MAl_2O_4$ or a mixed spinel $M_xM'_{(1-x)}Al_2O_4$ which is or is not partial, in which M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded.

The use of phases of spinel structures of type $MAl_2O_4$ or mixed spinels $M_xM'_{(1-x)}Al_2O_4$ has been described in documents FR2879478 and WO 2005/072866, M and M' being generally divalent metals such as Mg, Sn, Ni, Co and Cu. Reference may also be made to the publications by Rotan et coll. in Journal of the European Ceramic Society 33 (2013) 1-6 and Rytter et coll. in Top. Catal. 54 (2011) 801-810. In that case the divalent metal (in particular nickel) is introduced in the form of a precursor of nitrate type, for example at a level of a few percent, on the initial support containing alumina. The spinel phase is formed by calcination at very high temperature and stabilizes the whole of the support.

Very preferably M is cobalt or nickel in the case of simple spinel. Very preferably M is cobalt and M' is magnesium or zinc in the case of a mixed spinel.

Particularly preferably the spinel is a simple spinel $MAl_2O_4$ in which M is cobalt.

The content of the spinel is generally between 3 and 50% by weight and preferably between 5 and 40% by weight with respect to the weight of the support.

The content of metal M or M' is between 1 and 20% by weight and preferably between 2 and 10% by weight with respect to the weight of the support.

The formation of the simple or mixed spinel structure in said support, which is often referred to as the step for stabilisation of the support, can be effected by any method known to the man skilled in the art. It is generally effected by introducing the metal M or M' in the form of a salt precursor for example of nitrate type on the initial support containing the alumina. The spinel phase in which the metal M or M' are in the form of aluminate is formed by calcination at very high temperature and stabilizes the whole of the support.

The presence of a spinel phase in the catalyst used in the Fischer-Tropsch process according to the invention is measured by TPR (standing for "temperature programmed reduction" using the English terminology) as described for example in Oil & Gas Science and Technology, Rev. IFP, Vol. 64 (2009), No. 1, pp. 11-12. In that procedure the catalyst is heated under a flow of a reducing agent, for example dihydrogen. Measurement of the dihydrogen consumed in dependence on temperature gives quantitative information about the reducibility of the species present. The presence of a spinel phase in the catalyst is thus manifested by a consumption of dihydrogen at a temperature higher than about 800° C.

Preferably the oxides support containing alumina, silica, and at least one spinel as described hereinbefore is a silica-alumina in which the spinel is included, said support preferably having a silica content of between 0.5% by weight and 30% by weight with respect to the weight of the support, said support containing in addition at least one spinel as described hereinbefore. Preferably the silica content is higher than 10% going up to 30% by weight with respect to the weight of the support, the support further containing at least one spinel as described hereinbefore.

The specific surface area of the oxides support containing alumina, silica and at least one spinel as described hereinbefore is generally between 50 m2/g and 500 m2/g, preferably between 100 m2/g and 300 m2/g, more preferably between 150 m2/g and 250 m2/g. The core volume of the support is generally between 0.3 ml/g and 1.2 ml/g and preferably between 0.4 ml/g and 1 ml/g.

The support on which the active phase is deposited can be of a morphology in the form of balls, extrudates (for example of trilobal or quadrilobal shape) or pellets, in particular when the catalyst is used in a fixed-bed reactor, or it may involve a morphology in the form of powder of variable granulometry, in particular when the catalyst is used in a reactor of slurry bubble column type.

The specific surface area of the catalyst containing the active phase and the oxides support containing alumina, silica and at least one spinel as described hereinbefore is generally between 50 m2/g and 500 m2/g, preferably between 80 m2/g and 250 m2/g, more preferably between 90 m2/g and 150 m2/g. The pore volume of the catalyst is generally between 0.2 ml/g and 1 ml/g and preferably between 0.25 ml/g and 0.8 ml/g. Preferably the pore distribution is monomodal.

Preferably the catalyst according to the invention contains an active phase comprising cobalt and boron and optionally a supplementary doping element, preferably platinum, the boron content being between 0.001 and 0.5% by weight with respect to the total weight of the catalyst, the value 0.5 being itself excluded, preferably between 0.01 and 0.4% by weight, more preferably between 0.02 and 0.35% and still more preferably between 0.02 and 0.2% by weight, and a silica-alumina support in which a spinel is included, the silica content of the support preferably being between 1.5 and 20% by weight with respect to the weight of the support, said spinel being a simple spinel MAl2O4 or a mixed spinel MxM'(1-x)Al2O4 which is or is not partial, in which M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), and x is between 0 and 1, the values 0 and 1 being themselves excluded.

Particularly preferably the catalyst used for carrying out the Fischer-Tropsch process according to the invention is a catalyst in which the active phase is formed by cobalt and boron and optionally platinum and the oxides support is formed by a silica-alumina in which a spinel is included, the silica content of the support is between 1.5% and 20% by weight with respect to the weight of the support, said spinel being CoAl2O4, the boron content being between 0.001 and 0.5% by weight with respect to the total weight of the catalyst, the value 0.5 being itself excluded. Preferably the boron content is between 0.01 and 0.4% by weight with respect to the total weight of the catalyst, more preferably between 0.02 and 0.35% and still more preferably between 0.02 and 0.2% by weight.

Process for Preparation of the Catalyst

Preparation of the catalyst generally comprises in a first stage the preparation of the oxides support containing alumina, silica and at least one spinel and then in a second stage introduction of the active phase.

According to the invention the process for preparation of the catalyst comprises at least one step in which said support containing silica, alumina and spinel is impregnated with an aqueous or organic solution comprising at least one metal salt of group VIIIB selected from cobalt, nickel, ruthenium and iron, and at least one boron precursor.

Preferably impregnation of the precursor of the metal of group VIIIB selected from cobalt, nickel, ruthenium and iron can be carried in a plurality of steps, preferably two steps. Between each of the impregnation steps it is preferable to possibly effect at least one drying and/or calcination step under the conditions described hereinafter and/or reduction under the conditions described hereinafter.

More particularly the process for preparation of the catalyst according to the invention comprises the following steps:

an oxides support containing silica and alumina is provided;

the support containing silica and alumina is impregnated with an aqueous or organic solution comprising at least one salt of metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), it is then dried and calcined at a temperature between 700 and 1200° C. so as to obtain a simple spinel $MAl_2O_4$ or mixed spinel $M_xM'_{(1-x)}Al_2O_4$ which is or is not partial, wherein M and M' are separate metals and x is between 0 and 1, the values 0 and 1 being themselves excluded;

the oxides support containing silica, alumina and spinel is impregnated a first time with an aqueous or organic solution comprising at least one salt of metal of group VIIIB selected from cobalt, nickel, ruthenium and iron;

the oxides support containing silica, alumina and spinel is impregnated a second time with an aqueous or organic solution comprising at least one salt of metal of group VIIIB selected from cobalt, nickel, ruthenium and iron;

and the aqueous or organic solution impregnated in step c) and/or d) comprises a boron precursor.

In accordance with step a) there is provided a support containing alumina and silica. The content of silica SiO2 may vary from 0.5% by weight to 30% by weight, preferably from 1% by weight to 30% by weight and still more preferably from 1.5 to 20% by weight with respect to the weight of the support. Preferably there is provided a silica-alumina support. Such a support may be purchased or manufactured, for example by atomisation of an alumina precursor in the presence of a compound comprising silicon. The support containing alumina and silica can be prepared by any other means known to the man skilled in the art, for example by impregnation of an organosilylated compound of type TEOS (tetraethylorthosilicate) on an alumina. In that case that impregnation operation followed by drying and calcination is preliminary to step a) described hereinbefore.

The solid containing alumina and silica can then be dried and calcined. Drying is advantageously effected at a temperature of between 60° C. and 200° C., preferably for a period ranging from 3 minutes to 3 hours. Calcination is advantageously effected at a temperature of between 200° C. and 1100° C., preferably for a period ranging from 1 hour to 24 hours and preferably from 2 hours to 8 hours. Calcination is generally effected in an oxidising atmosphere, for example in air, or in air with a reduced oxygen content; it may also be effected at least in part in nitrogen.

All the drying and calcination steps described in the present description can be carried out by any process known to the man skilled in the art: fixed bed, fluidised bed, oven, muffle furnace and rotating furnace.

Step b) consists of impregnation, preferably dry impregnation, of the support containing alumina and silica, by an aqueous solution of one or more salts of a metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), preferably cobalt, nickel, magnesium, calcium and zinc and very preferably cobalt and nickel and particularly preferably cobalt, followed by drying and calcination at a temperature of between 700 and 1200° C.

The metal M or M' is brought into contact with the support through the intermediary of any metallic precursor which is soluble in an aqueous phase. Preferably when the metal M or M' belongs to the group VIIIB, then the precursor of the metal of group VIIIB is introduced in aqueous solution, preferably in the form of nitrate, carbonate, acetate, chloride, oxalate, complexes formed by a polyacid or an acid-alcohol and salts thereof, complexes formed with acetylacetonates, or any other inorganic derivative soluble in aqueous solution, which is brought into contact with the support. In the preferred case where the metal M is cobalt the cobalt precursor which is advantageously used is cobalt nitrate, cobalt oxalate or cobalt acetate.

The content of metal M or M' is advantageously between 1 and 20% by weight and preferably between 2 and 10% by weight with respect to the total mass of the final support.

The drying operation is advantageously carried out at a temperature between 60° C. and 200° C., preferably for a period ranging from 30 minutes to 3 hours.

The calcination operation is carried out at a temperature between 700 and 1200° C., preferably between 850 and 1200° C. and preferably between 850 and 900° C., generally for a period between one hour and 24 hours and preferably between 2 hours and 5 hours. Calcination is generally carried out in an oxidising atmosphere, for example in air or in air with a reduced oxygen content; it can also be carried out at least in part in nitrogen. It makes it possible to transform the precursors M and M' and alumina into a structure of spinel type (M and M' aluminate).

In a variant the calcination operation can also be carried out in two steps, the calcination operation advantageously being performed at a temperature between 300° C. and 600° C. in air for a period between half an hour and 3 hours, and then at a temperature between 700° C. and 1200° C., preferably between 850 and 1200° C., and preferred between 850 and 900° C., generally for a period of between one hour and 24 hours and preferably between 2 hours and 5 hours.

Thus, at the end of step b), the support containing alumina and silica further contains at least one simple spinel MAl2O4 or mixed spinel MxM'(1-x)Al2O4 which is or is not partial, in which the metals M and M' are in the form of aluminates.

Preferably, in step c), the support is impregnated with a solution comprising solely the precursor of the metal of group VIIIB selected from cobalt, nickel, ruthenium and iron; and in step d) the support of step c) is impregnated with a solution comprising the boron precursor and the precursor of the metal of group VIIIB selected from cobalt, nickel, ruthenium and iron.

In particular impregnation steps c) and d) are performed by dry impregnation, by excess impregnation or again by deposit-precipitation using the methods well known to the man skilled in the art. Preferably impregnation steps c) and d) are carried out by dry impregnation, preferably at ambient temperature, and preferably at a temperature equal to 20° C.

More particularly impregnation steps c) and/or d) involve bringing said support into contact with a solution comprising at least one precursor of the metal of group VIIIB and a solution comprising a boron precursor (supplied in step c) and/or d)). The total volume of solutions impregnated in steps c) and d) is equal to the pore volume of the support to be impregnated.

The metallic precursor of the metal or metals of group VIIIB is supplied in solution at a desired concentration to obtain on the final catalyst the intended metal content, advantageously a metal content of between 0.01 and 60% by weight and preferably between 5 and 30% by weight with respect to the weight of the catalyst. Preferably the metal content of the metal or metals of group VIIIB supplied in step c) is between 0.005 and 30% by weight with respect to the total weight of the catalyst, preferably between 1 and 30% by weight and still more preferably between 2.5 and 15% by weight. The metal content of the metal or metals of group VIIIB supplied in step d) is between 0.005 and 30% by weight with respect to the total weight of the catalyst, preferably between 1 and 30% by weight and still more preferably between 2.5 and 15%.

The solution containing the boron precursor is supplied at a desired concentration to obtain on the final catalyst a boron content of between 0.001 and 0.5% by weight, the value 0.5 being itself excluded, preferably between 0.02 and 0.4% by weight with respect to the weight of the catalyst, more preferably between 0.02 and 0.35% and still more preferably between 0.02 and 0.2% by weight with respect to the weight of the catalyst. Preferably the boron precursor is supplied in solution in step b), simultaneously with the precursor of the metal or metals of group VIIIB (co-impregnation).

The metal or metals of group VIIIB are brought into contact with the support through the intermediary of any metallic precursor which is soluble in an aqueous phase or an organic phase. When it is introduced in organic solution the precursor of the metal of group VIIIB is preferably the oxalate or acetate of said metal of group VIIIB. Preferably the precursor of the metal of group VIIIB is introduced in aqueous solution, preferably in the form of nitrate, carbonate, acetate, chloride, oxalate, complexes formed by a polyacid or an acid-alcohol and salts thereof, complexes formed with acetylacetonates, or any other inorganic derivative which is soluble in aqueous solution, which is brought into contact with said support. In the preferred case where the metal of group VIIIB is cobalt the cobalt precursor which is advantageously used is cobalt nitrate, cobalt oxalate or cobalt acetate. Most preferably the precursor used is cobalt nitrate.

The boron source may be boric acid, preferably orthoboric $H_3BO_3$, biborate or pentaborate of ammonium, boron oxide, and boric esters. The boron may for example be introduced in the form of a mixture of boric acid, oxygenated water and a basic organic compound containing nitrogen such as ammonia, primary and secondary amines, cyclic amines, compounds of the family of pyridine and quinolines and compounds of the family of pyrrole. The boron can be introduced for example by a solution of boric acid in a water/alcohol mixture.

The steps c) and d) for impregnation of the support with the active phase can also advantageously comprise at least one supplementary step consisting of depositing at least one supplementary doping element selected from a noble metal of groups VIIB or VIIIB on the oxides support. The doping element is preferably selected from platinum (Pt), palladium (Pd), rhodium (Rh) or also rhenium (Re). More preferably the supplementary doping element is platinum (Pt). Deposit of the supplementary doping element on the support can advantageously be carried out by any method known to the man skilled in the art, preferably by impregnation of the oxides support with at least one solution containing at least one precursor of the supplementary doping element and preferably by dry impregnation or by excess impregnation. That solution contains at least one precursor of the supplementary doping element at the desired concentration to obtain on the final catalyst the supplementary doping element content of between 20 ppm and 1% by weight and preferably between 0.01 and 0.5% by weight with respect to the weight of the catalyst. Subsequently the catalyst containing the doping element is dried and calcined under the same conditions as those described in the drying and calcination steps upon impregnation of the active phase.

Introduction of the supplementary doping element can be carried out at the same time as impregnation of the aqueous or organic solution comprising said metal salt of group VIIIB selected from cobalt, nickel, ruthenium and iron, and said boron precursor, that is to say in step c) and/or d), or in a supplementary step (after step d)). Preferably the supplementary doping element is introduced at the same time as impregnation of said aqueous or organic solution comprising said metal salt of group VIIIB selected from cobalt, nickel, ruthenium and iron, and the boron precursor.

The catalyst obtained in that way is then dried and calcined. Drying is advantageously carried out at a temperature between 60° C. and 200° C., preferably for a period ranging from 30 minutes to 3 hours. Calcination is advantageously performed at a temperature between 320° C. and 460° C., preferably between 350 and 440° C. and in preferred fashion between 360 and 420° C. It is preferably carried out for a period of between 15 minutes and 15 hours and preferably between 30 minutes and 12 hours and still more preferably between 1 hour and 6 hours. Calcination is generally effected in an oxydising atmosphere, for example in air, or in air with a reduced oxygen content; it may also be carried out at least in part in nitrogen.

Prior to its use in the Fischer-Tropsch synthesis catalytic reactor the catalyst is generally subjected to a reducing treatment, for example in pure or dilute hydrogen, at high temperature, which is intended to activate the catalyst and form particles of metal in the zero valent state (in metallic form). That treatment can be carried out in situ (in the same reactor as that in which the Fischer-Tropsch synthesis is performed) or ex situ before being loaded into the reactor. The temperature of that reducing treatment is preferably between 200° C. and 500° C. and the duration thereof is generally between 2 and 20 hours.

Fischer-Tropsch Process

The present invention also concerns a Fischer-Tropsch process involving bringing a feedstock comprising synthesis gas into contact under Fischer-Tropsch synthesis operating conditions with at least one catalyst according to the invention or prepared according to the preparation process of the invention.

The Fischer-Tropsch process permits the production of essentially linear and saturated C5+ hydrocarbons. According to the invention the term essentially linear and saturated C5+ hydrocarbons is used to denote hydrocarbons in which the proportion of hydrocarbon compounds having at least 5 carbon atoms per molecule represents at least 50% by weight, preferably at least 80% by weight of the whole of the hydrocarbons formed, the total content of olefinic compounds present among said hydrocarbon compounds having at least 5 carbon atoms per molecule being less than 15% by weight. The hydrocarbons produced by the process of the invention are thus essentially paraffinic hydrocarbons of which the fraction having the highest boiling points can be converted with a high yield into medium distillates (gasoil and kerosene cuts) by a catalytic hydroconversion process such as hydrocracking and/or hydroisomerisation.

Preferably the feedstock used for carrying out the process of the invention is formed by the synthesis gas which is a mixture of carbon monoxide and hydrogen in H2/CO molar ratios which can vary between 0.5 and 4 in dependence on the production process from which it arises. The H2/CO molar ratio of the synthesis gas is generally close to 3 when the synthesis gas is obtained from the process for steam reforming of hydrocarbons or alcohol. The H2/CO molar ratio of the synthesis gas is of the order of 1.5 to 2 when the synthesis gas is obtained from a partial oxidation process. The H2/CO molar ratio of the synthesis gas is generally close to 2.5 when it is obtained from an autothermal reforming process. The H2/CO molar ratio of the synthesis gas is generally close to 1 when it is obtained from a process for gasification and reforming hydrocarbons with CO2 (referred to as dry reforming).

The Fischer-Tropsch process according to the invention is operated under a total pressure of between 0.1 and 15 MPa, preferably between 0.5 and 10 MPa, at a temperature between 150 and 350° C., preferably between 180 and 270° C. The hourly space velocity is advantageously between 100 and 20000 volumes of synthesis gas per volume of catalyst and per hour (100 to 20000 h-1) and preferably between 400 and 10000 volumes of synthesis gas per volume of catalyst and per hour (400 to 10000 h-1).

The Fischer-Tropsch process according to the invention can be effected in a reactor of the perfectly agitated autoclave, boiling bed, slurry bubble column, fixed bed or mobile bed type. Preferably it is effected in a reactor of slurry bubble column type.

For that reason the size of the grains of catalyst used in the Fischer-Tropsch process can be between a few microns and 2 millimetres. Typically for implementation in a three-phase "slurry" reactor (bubble column) the catalyst is finely divided and is in the form of particles. The size of the catalyst particles will be between 10 and 500 micrometres (μm), preferably between 10 and 300 μm and very preferably between 20 and 150 μm and still more preferably between 20 and 120 μm.

To illustrate the invention and to permit the man skilled in the art to carry it into effect we set forth hereinafter different embodiments of the process for preparation of a catalyst used for Fischer-Tropsch synthesis; however that would not limit the scope of the invention.

Example 1: Preparation of Catalysts A and B (Comparative) and Catalyst C (According to the Invention)

Catalyst A (not According to the Invention): Catalyst 25% Co on Silica-Alumina with 5% $SiO_2$ and 5% Co in Aluminate Form (Spinel)

Using a commercial support Siralox® 5 (Sasol, Germany) containing 5% by weight of SiO2, impregnated thereon is a solution of cobalt nitrate, then the solid is dried in a drying oven for 12 hours at 120° C. and calcined in a tubular fixed-bed reactor at 800° C. for 2 hours. That high-temperature calcination operation makes it possible to form the cobalt aluminate spinel phase (5% by weight of cobalt). A solution of cobalt nitrate is impregnated on that support which is stabilized by silicon and by cobalt in the form of spinel. The solid obtained is then dried in a drying oven for 12 hours and then calcined in air in a tubular fixed-bed reactor at 420° C. for 2 hours. It contains 15.0% by weight of cobalt. That intermediate solid is subjected to a fresh impregnation operation using a solution of cobalt nitrate, then a drying operation and a calcination operation which are identical to the preceding step. The final catalyst A is obtained in two preparation steps, containing 25.0% by weight of cobalt (the content of Co present in the spinel phase being included) and a content of reducible cobalt of 20.0% by weight.

Catalyst B (not According to the Invention): Catalyst 25% Co+0.5% B on Silica-Alumina with 5% $SiO_2$ and 5% Co in Aluminate Form (Spinel)

Using a commercial support Siralox® 5 (Sasol, Germany) containing 5% by weight of SiO2, impregnated thereon is a solution of cobalt nitrate, then the solid is dried in a drying oven for 12 hours at 120° C. and calcined in a tubular fixed-bed reactor at 800° C. for 2 hours. That high-temperature calcination operation makes it possible to form the cobalt aluminate spinel phase (5% by weight of cobalt). A solution containing cobalt nitrate and boric acid is impregnated on that support which is stabilized by silicon and by cobalt in the form of spinel. The solid obtained is then dried in a drying oven for 12 hours and then calcined in air in a tubular fixed-bed reactor at 420° C. for 2 hours. It contains 15.0% by weight of cobalt and 0.27% by weight of boron. That intermediate solid is subjected to a fresh impregnation operation using a solution of cobalt nitrate and boric acid, then a drying operation and a calcination operation which are identical to the preceding step. The final catalyst B is obtained in two preparation steps, containing 25.0% by weight of cobalt and 0.5% by weight of boron (the content of Co present in the spinel phase being included) and a content of reducible cobalt of 20.0% by weight.

Catalyst C (According to the Invention): Catalyst 25% Co+0.2% B on Silica-Alumina with 5% $SiO_2$ and 5% Co in Aluminate Form (Spinel)

Using a commercial support Siralox® 5 (Sasol, Germany) containing 5% by weight of SiO2, impregnated thereon is a solution of cobalt nitrate, then the solid is dried in a drying oven for 12 hours at 120° C. and calcined in a tubular fixed-bed reactor at 800° C. for 2 hours. That high-temperature calcination operation makes it possible to form the cobalt aluminate spinel phase (5% by weight of cobalt). A solution containing cobalt nitrate and boric acid is impregnated on that support which is stabilised by silicon and by cobalt in the form of spinel. The solid obtained is then dried in a drying oven for 12 hours and then calcined in air in a tubular fixed-bed reactor at 420° C. for 2 hours. It contains 15.0% by weight of cobalt and 0.11% by weight of boron. That intermediate solid is subjected to a fresh impregnation operation using a solution of cobalt nitrate and boric acid, then a drying operation and a calcination operation which are identical to the preceding step. The final catalyst C is obtained in two preparation steps, containing 25.0% by weight of cobalt and 0.2% by weight of boron (the content of Co present in the spinel phase being included) and a content of reducible cobalt of 20.0% by weight.

Example 2: Catalytic Performances in the Fischer-Tropsch Process of Catalysts A to C Catalysts A to C, before being successively tested in respect of conversion of the synthesis gas, are reduced ex situ in a flow of pure hydrogen at 400° C. for 16 hours in a tubular reactor. Once the catalyst reduced it is discharged in a an argon atmosphere and coated with Sasolwax® wax to be stored protected from air prior to the test. The Fischer-Tropsch synthesis reaction is carried out in a reactor of slurry type and operating continuously with a concentration of 10% (by volume) of catalyst in a slurry phase.

Each of the catalysts is in the form of powder of a diameter of between about 30 and 170 microns.

The test conditions are as follows:
Temperature=220° C.
Total pressure=2 MPa
$H_2$/CO molar ratio=2
Conversion of CO is maintained at between 45 and 50% throughout the entire duration of the test.

The test conditions are adjusted so as to be at isoconversion of CO irrespective of the activity of the catalyst.

The results have been calculated for catalysts A to C with respect to catalyst A serving as a reference and are set out in Table 1 below. The alpha paraffin selectivities are also specified as well as the methane selectivity.

Measurement of the selectivity in respect of alpha paraffin is effected by way of an analysis by gaseous phase chromatography of the effluents from the reaction, quantitative determination of the paraffins and calculation of the gradient of the curve log mol (%)=f (carbon number), which corresponds to the alpha coefficient.

TABLE

| Cat. | Target formulation (% by weight with respect to the total weight of the catalyst) | Relative activity after 300 test hours under syngas load | Methane formation selectivity (%) | Selectivity α of long paraffins |
|---|---|---|---|---|
| A | 25% Co | 100 (base) | 10 | 0.894 |
| B | 25% Co + 0.5% B | 104 | 10.5 | 0.892 |
| C | 25% Co + 0.2% B | 145 | 10 | 0.896 |

The results of Table 1 show the catalytic performances of the catalysts A to C; it appears that the catalyst C according to the invention affords significant gains in activity with respect to the comparative catalysts while maintaining selectivity equivalent to the catalyst A.

The invention claimed is:

1. A catalyst consisting of an active phase of cobalt deposited on a support of silica, alumina, at least one simple spinel $MAl_2O_4$ wherein M is cobalt (Co),
    and boron, at a boron content of 0.02 to 0.2% by weight with respect to the total weight of the catalyst.

2. The catalyst according to claim 1, wherein said support is a silica-alumina in which the at least one simple spinel is included.

3. The catalyst according to claim 1, having a simple spinel content of 3 to 50% by weight with respect to the weight of the support.

4. The catalyst according to claim 1, having a metal cobalt content in the at least one simple spinel of 1 to 20% by weight with respect to the weight of the support.

5. The catalyst according to claim 1, having a content of the cobalt of the active phase of 0.01 to 60% by weight with respect to the weight of the catalyst.

6. A process for the preparation of a catalyst according to claim 1, which process comprises at least one impregnation of said support of silica, alumina and said at least one simple spinel with an aqueous or organic solution of at least one metal salt of cobalt, and at least one boron precursor.

7. The process according to claim 6 in which the at least one boron precursor is boric acid.

8. The process according to claim 6 comprising:
    a) providing a support of the silica and alumina;

b) impregnating said support with an aqueous or organic solution of at least one salt of cobalt (Co), drying and calcining at a temperature of 700 to 1200° C. so as to obtain the at least one simple spinel $MAl_2O_4$ wherein M is cobalt;
c) impregnating said support of silica, alumina and simple spinel a first time with an aqueous or organic solution of at least one salt of cobalt;
d) impregnating said support of silica, alumina and simple spinel a second time with an aqueous or organic solution of at least one salt of cobalt so as to obtain the catalyst;
in which process said aqueous or organic solution impregnated in c) and/or d) provides the at least one boron precursor.

9. The process according to claim 8 in which the at least one boron precursor is introduced solely in the aqueous or organic solution supplied in d).

10. The process according to claim 8, comprising supplying in the aqueous or organic solution in c) a content of cobalt of 0.005 to 30% by weight with respect to the weight of the catalyst.

11. The process according to claim 8, comprising supplying in the aqueous or organic solution in d) a content of cobalt of 0.005 to 30% by weight with respect to the total weight of the catalyst.

12. The process according to claim 8 in which the catalyst obtained in d) is dried for 30 minutes to 3 hours and then said dried catalyst is calcined in an oxidizing atmosphere at a temperature of 320° C. to 460° C.

13. The process according to claim 12 in which the dried and calcined catalyst is reduced at a temperature of 200° C. to 500° C.

14. A Fischer-Tropsch process for the synthesis of hydrocarbons, comprising contacting the catalyst according to claim 1 with a feedstock comprising synthesis gas under a total pressure of between 0.1 and 15 MPa at a temperature of 150 to 350° C. and at an hourly space velocity of 100 to 20000 volumes of synthesis gas per volume of catalyst and per hour with a $H_2/CO$ molar ratio of the synthesis gas of 0.5 to 4.

* * * * *